(12) United States Patent
Volny et al.

(10) Patent No.: US 11,225,329 B2
(45) Date of Patent: Jan. 18, 2022

(54) DAMPENING RISERS FOR PARACHUTES

(71) Applicant: GOODRICH CORPORATION, Charlotte, NC (US)

(72) Inventors: Jaro S. Volny, Scottsdale, AZ (US); Timothy C. Haynes, Prescott Valley, AZ (US)

(73) Assignee: Goodrich Corporation, Charlotte, NC (US)

( * ) Notice: Subject to any disclaimer, the term of this patent is extended or adjusted under 35 U.S.C. 154(b) by 312 days.

(21) Appl. No.: 16/279,579

(22) Filed: Feb. 19, 2019

(65) Prior Publication Data

US 2020/0262569 A1    Aug. 20, 2020

(51) Int. Cl.
*B64D 17/22*    (2006.01)

(52) U.S. Cl.
CPC .................. *B64D 17/22* (2013.01)

(58) Field of Classification Search
CPC ......... B64D 17/22; B64D 17/24; B64D 17/36
See application file for complete search history.

(56) References Cited

U.S. PATENT DOCUMENTS

| | | | | | |
|---|---|---|---|---|---|
| 1,935,339 | A | * | 11/1933 | Tricau | B64D 17/36 244/151 R |
| 2,165,273 | A | * | 7/1939 | Kessenich | B64F 1/02 244/138 R |
| 2,352,036 | A | * | 6/1944 | Tauty | B60R 22/28 244/151 R |
| 2,474,124 | A | * | 6/1949 | Schultz | B60R 22/28 244/151 R |
| 3,444,957 | A | * | 5/1969 | Gilpin, Jr. | F16F 7/00 182/3 |
| 4,253,544 | A | * | 3/1981 | Dalmaso | A62B 35/04 182/18 |
| 5,472,155 | A | * | 12/1995 | Mastrolia | B64D 17/24 244/145 |
| 6,533,066 | B1 | * | 3/2003 | O'Dell | A62B 35/04 182/3 |
| 7,448,577 | B2 | * | 11/2008 | Sadeck | B64D 1/14 188/375 |
| 7,644,986 | B2 | * | 1/2010 | Berger | B60N 2/42709 297/216.11 |
| 2009/0023352 | A1 | * | 1/2009 | Russell | D03D 11/02 442/182 |
| 2011/0072621 | A1 | * | 3/2011 | Rinklake | A62B 35/04 24/115 K |
| 2014/0273697 | A1 | * | 9/2014 | Russell | D06C 7/00 442/206 |
| 2016/0097156 | A1 | * | 4/2016 | Gallon | B64D 17/24 244/142 |
| 2020/0030645 | A1 | * | 1/2020 | Bertoti | A62B 35/04 |

\* cited by examiner

*Primary Examiner* — Richard G Davis
(74) *Attorney, Agent, or Firm* — Snell & Wilmer L.L.P.

(57) ABSTRACT

A suspension line assembly for a parachute may comprise a plurality of suspension lines bound together at a confluence, and a dampening riser coupled to the confluence, wherein the dampening riser comprises a first length in the stowed position and the dampening riser is configured to extend to a second length in a deployed position in response to a tensile force applied to the dampening riser.

18 Claims, 8 Drawing Sheets

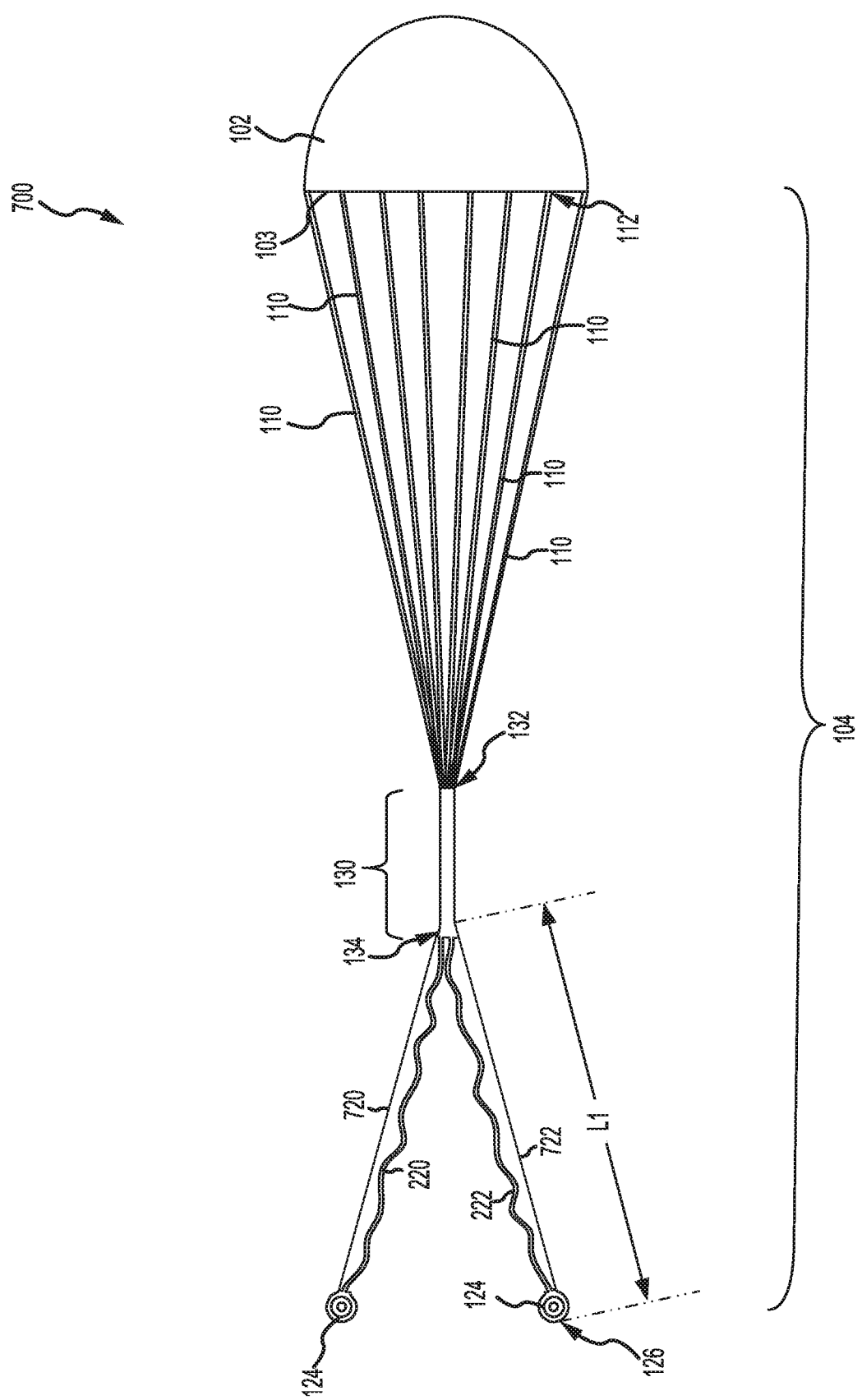

DAMPENING RISERS FOR PARACHUTES

FIELD

The present disclosure relates to parachutes, and more specifically, to parachutes and methods of making parachutes having dampening risers.

BACKGROUND

Parachutes may be used to slow and stabilize an object (e.g., ejection seat or a person) supported by the parachute. Parachutes typically comprise a canopy to increase drag, and suspension lines coupled to the canopy. The suspension lines may be weaved or otherwise bound to one another to form risers configured to attach the object to the parachute and stabilize the object to reduce rotation while under canopy.

SUMMARY

A suspension line assembly for a parachute is disclosed, comprising a plurality of suspension lines bound together at a confluence, and a dampening riser coupled to the confluence, wherein the dampening riser comprises a first length in a stowed position and the dampening riser is configured to extend to a second length in a deployed position in response to a tensile force applied to the dampening riser.

In various embodiments, the first length is less than the second length.

In various embodiments, the first length is at least ten percent less than the second length.

In various embodiments, the dampening riser comprises a webbing and a thread holding the webbing in a folded position, wherein the thread is configured to tear in response to the dampening riser moving to the deployed position.

In various embodiments, the dampening riser comprises a webbing and a thread holding the webbing in a compressed position, wherein the thread is configured to tear in response to the dampening riser moving to the deployed position.

In various embodiments, the dampening riser comprises a fully oriented yarn (FOY) webbing and a partially oriented yarn (POY), wherein the FOY webbing is held in a compressed position by the POY, wherein the POY is configured to plastically deform in response to the dampening riser moving to the deployed position.

In various embodiments, the dampening riser comprises a partially oriented yarn (POY) webbing, wherein the POY webbing is configured to plastically deform in response to the dampening riser moving to the deployed position.

In various embodiments, the suspension line assembly further comprises a first riser formed from a first set of the plurality of suspension lines, a second riser formed from a second set of the plurality of suspension lines, and a second dampening riser, wherein the dampening riser is coupled in parallel with the first riser, and the second dampening riser is coupled in parallel with the first riser.

A parachute is disclosed, comprising a canopy and a suspension line assembly coupled to the canopy, the suspension line assembly comprising a plurality of suspension lines bound together at a confluence, and a dampening riser coupled to the confluence, wherein the dampening riser comprises a first length in a stowed position and the dampening riser is configured to extend to a second length in response to the canopy being deployed.

In various embodiments, the dampening riser extends to the second length in response to a tensile force applied to the dampening riser.

In various embodiments, the first length is less than the second length.

In various embodiments, the first length is at least ten percent less than the second length.

In various embodiments, the dampening riser comprises a webbing and a thread holding the webbing in a folded position, wherein the thread is configured to tear in response to the dampening riser moving to a deployed position.

In various embodiments, the dampening riser comprises a webbing and a thread holding the webbing in a compressed position, wherein the thread is configured to tear in response to the dampening riser moving to a deployed position.

In various embodiments, the dampening riser comprises a fully oriented yarn (FOY) webbing and a partially oriented yarn (POY), wherein the FOY webbing is held in a compressed position by the POY, wherein the POY is configured to plastically deform in response to the dampening riser moving to a deployed position.

In various embodiments, the dampening riser comprises a partially oriented yarn (POY) webbing, wherein the POY webbing is configured to plastically deform in response to the dampening riser moving to a deployed position.

In various embodiments, the parachute further comprises a first riser formed from a first set of the plurality of suspension lines, a second riser formed from a second set of the plurality of suspension lines, and a second dampening riser, wherein the dampening riser is coupled in parallel with the first riser, and the second dampening riser is coupled in parallel with the first riser.

A method of making a parachute is disclosed, comprising forming a first riser by binding a first set of suspension lines together, forming a second riser by binding a second set of suspension lines together, forming a confluence using the first set of suspension lines and the second set of suspension lines, coupling a first dampening riser in parallel with the first riser between the confluence and a first attachment location of the first riser, and coupling a second dampening riser in parallel with the second riser between the confluence and a second attachment location of the second riser.

In various embodiments, the method further comprises coupling a canopy to the first set of suspension lines and the second set of suspension lines.

In various embodiments, the method further comprises forming the first dampening riser and the second dampening riser, wherein a length of the first dampening riser is less than that of the first riser.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 7A illustrates a parachute having dampening risers in stowed positions and each dampening riser comprising a first length, in accordance with various embodiments:

Figure 1A:
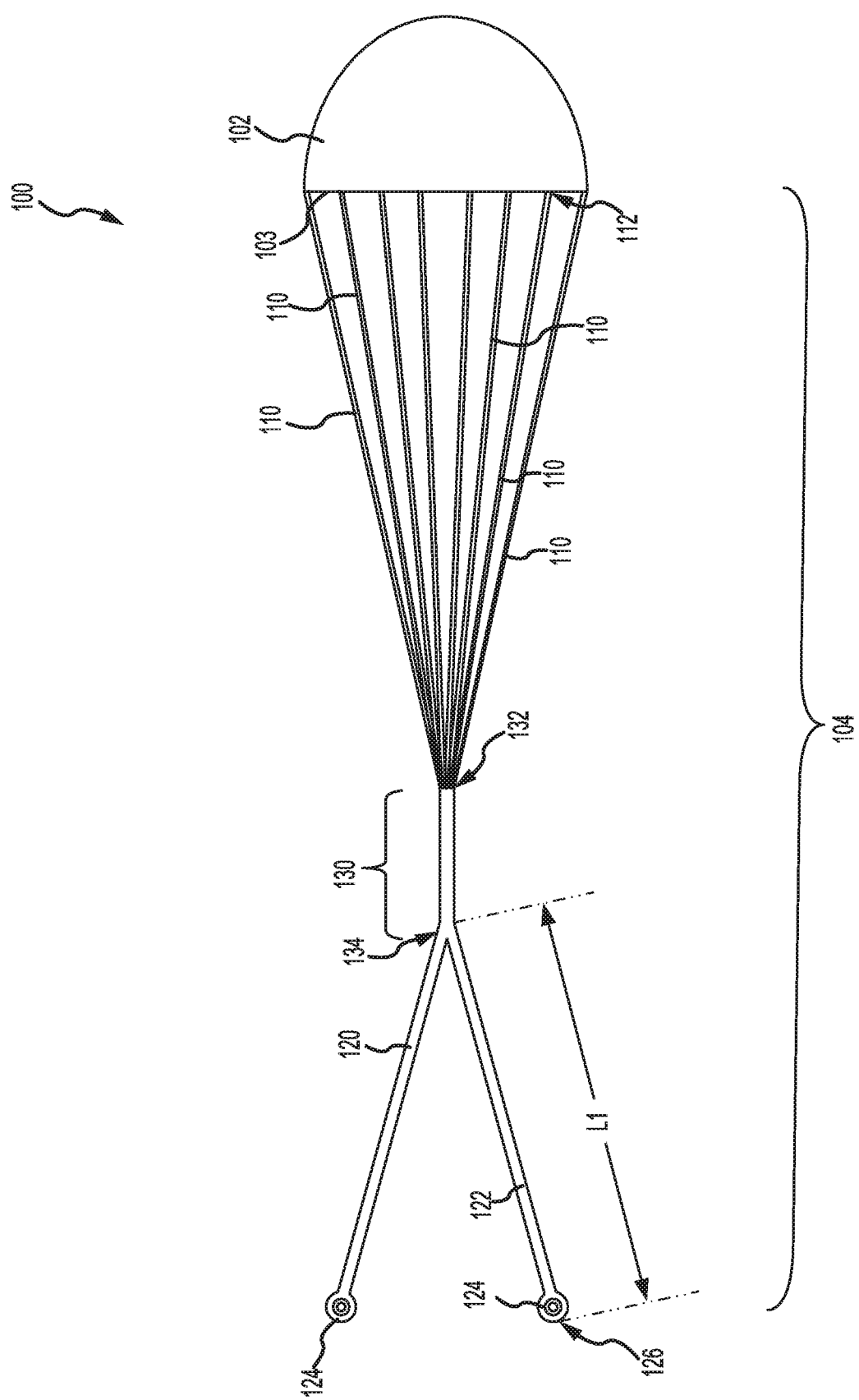
FIG. 1A illustrates a parachute having dampening risers in stowed positions and each comprising a first length, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a parachute including a suspension line assembly having dampening risers. The dampening rises may be configured to dampen tensile forces through the suspension line assembly utilizing plastic deformation and/or tear-attenuation.

As used herein, the term "partially oriented yarn (POY)" refers to a yarn that is produced from the melting and extrusion (melt spinning) of a polyester chip or flake. During the spinning process, the filaments are stretched or drawn as much as five times their original size to orient the polymer to meet the desired evenness, strength, shrinkage, and elongation properties. So the term "partially oriented yarn" refers to multi-filament that is only partially stretched. POY is generally lower tenacity and less uniform than fully oriented yarn (FOY).

A POY, as used herein, may be configured to plastically deform. In contrast to elastic deformation, which stores energy and is generally self-reversing, plastic deformation dampens energy generally without storing energy. In this regard, a dampening riser may utilize plastic deformation for dampening tensile forces through the riser, thereby decreasing peak forces experienced by a person attached to the parachute.

Figure 1B:
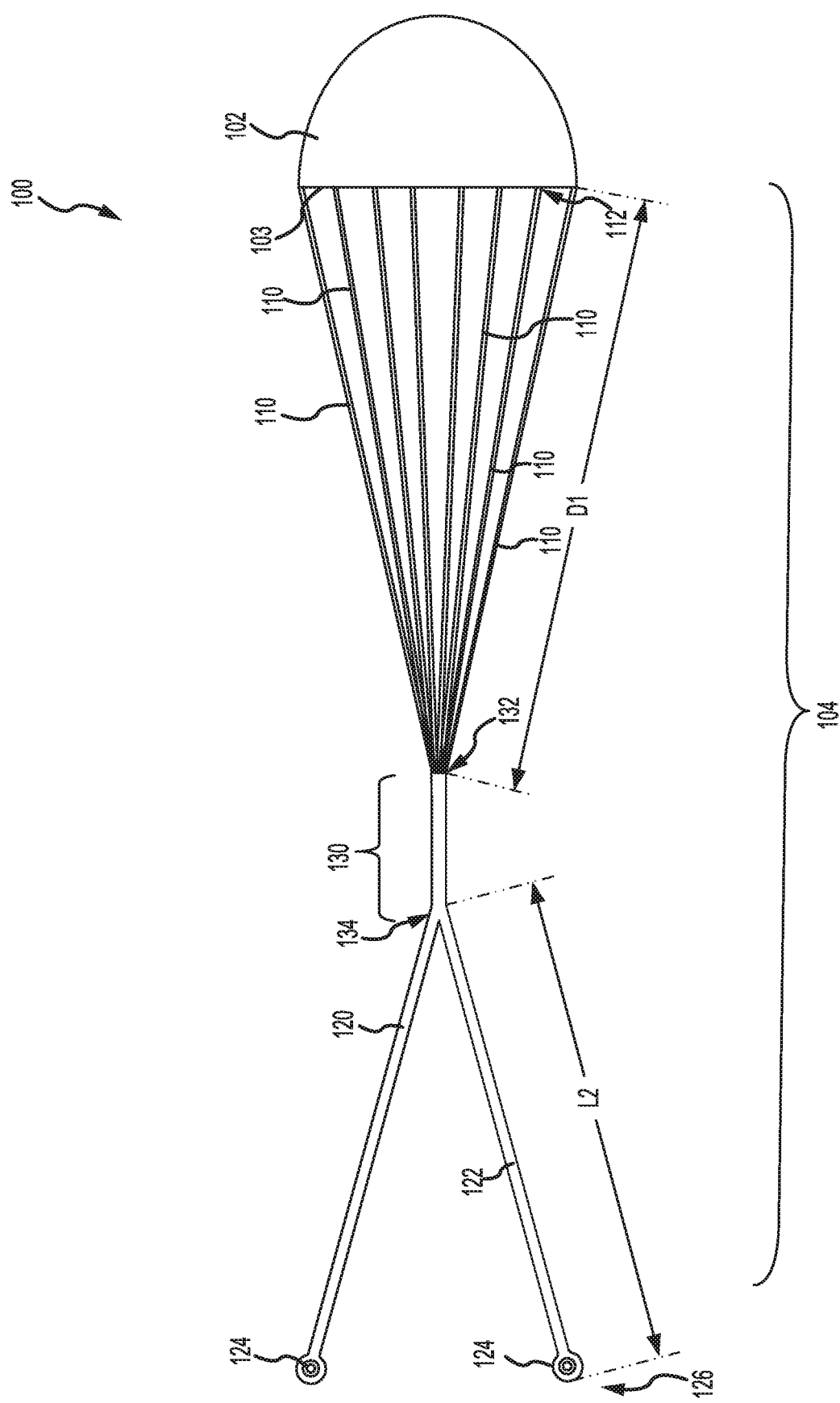
FIG. 1B illustrates a parachute having risers in stowed positions and each comprising a second length, in accordance with various embodiments.

With reference to FIGS. 1A and 1B, a dampening riser parachute 100 is illustrated deployed to a first length (FIG. 1A) and to a second, longer length (FIG. 1B). Dampening riser parachute 100 may comprise a canopy 102 and a suspension line assembly 104. Suspension line assembly 104 may comprise suspension lines 110, a confluence 130, a first dampening riser 120, and a second dampening riser 122. In various embodiments. Suspension lines 110 may be attached to canopy 102 at a first end 112 of suspension line assembly 104. Suspension lines 110 may be coupled to canopy 102 using any suitable technique, such as, for example, through stitching, and/or through any other suitable method. Suspension lines 110 may each comprise a braided material, for example, braided nylon, aramid fiber (e.g., KEVLAR®), and/or the like. Dampening riser parachute 100 may be used to increase an object's, article's, person's, and/or the like's (collectively. "object") drag in response to the object being dropped, jumped, ditched, and/or ejected (collectively, "dropped") from an aircraft.

Figure 2:
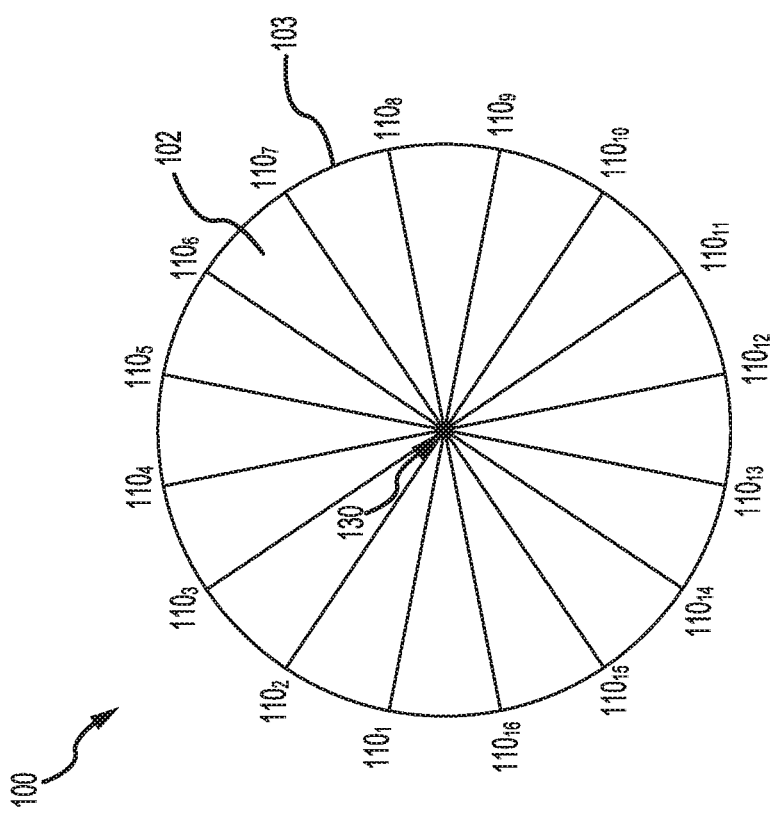
FIG. 2 illustrates suspension lines attached about a canopy circumference, in accordance with various embodiments.

With reference to FIG. 2, suspension lines 110 are numbered circumferentially based on their attachment along a circumference, or perimeter, 103 of canopy 102. For example, going in a first circumferentially direction (e.g., clockwise), suspension line $110_1$ is circumferentially adjacent to suspension line $110_2$, suspension line $110_2$ is circumferentially adjacent to suspension line $110_3$, suspension line $110_3$ is circumferentially adjacent to suspension line $110_4$, etc. The "number 1" suspension line (e.g., suspension line $110_1$) is located circumferentially between the "number 2" suspension line (e.g., suspension line $110_2$) and the final or "number n" suspension line (e.g., suspension line $110_{16}$).

With combined reference to FIGS. 1A and 1B, suspension line assembly 104 includes a first dampening riser 120 and a second dampening riser 122. First and second dampening risers 120, 122 may be formed by binding, or otherwise coupling, suspension lines 110 together. For example, a first set of suspension lines 110 (e.g., suspension lines $110_1$-$110_8$) may be bound or coupled together to form first dampening riser 120, and a second set of suspension lines 110 (e.g., suspension lines $110_9$-$110_{16}$) may be bound or coupled together to form second dampening riser 122. Suspension lines $110_1$-$110_8$ may be bound together via weaving, stitching, adhesive, and/or through any other suitable attachment method to form first dampening riser 120. Suspension lines $110_9$-$110_{16}$ may be bound together via weaving, stitching, adhesive, and/or through any other suitable attachment method to form second dampening riser 122. While parachute 100 is illustrated as having 16 suspension lines 110 (i.e., suspension lines $110_1$-$110_{16}$) with 8 circumferentially adjacent suspension lines 110 per dampening riser, it is further contemplated and understood that parachute 100 may include any number of suspensions lines 110, such as, for example, 4 to 32 suspension lines 110, and first and second dampening risers 120, 122 may be formed from any number of suspension lines 110, such as, for example, 8 to 16 suspension lines 110 per dampening riser, or 2 to 6 suspension lines 110 per dampening riser. Additionally, parachute 100 may include more than 2 dampening risers.

In various embodiments, first and second dampening risers 120, 122 may be formed as separate members from suspension lines 110. For example, suspension lines 110 may be coupled to first and second dampening risers 120, 122 by weaving, stitching, adhering, braiding, and/or or coupling (e.g., via a shackle) suspension lines 110 to first and second dampening risers 120, 122.

First and second dampening risers 120, 122 may be configured to attach an object, such as an ejections seat or an occupant harness, to parachute 100. In various embodiments, first and second dampening risers 120, 122 may each comprise an attachment location 124. Attachment locations 124 may be proximate a second end 126 of suspension line assembly 104. Second end 126 is generally opposite first end 112 and canopy 102. Stated differently, suspension lines 110 may be coupled to canopy 102 at first end 112 and to an object at second end 126. Attachment location 124 may comprise any suitable attachment mechanism for securing an object to parachute 100. In various embodiments, attachment location 124 may comprise a loop created by each dampening riser being bound to itself. In various embodiments, attachment location 124 may comprise a shackle.

Suspension line assembly 104 includes a confluence 130. Confluence 130 may be configured to connect suspension lines 110 to first and second dampening risers 120, 122. In various embodiments, confluence 130 may comprise an area of dampening riser parachute 100 wherein suspension lines 110 are bound together. Suspension lines 110 may be bound together in confluence 130 via weaving, stitching, and/or through any other suitable method. Each dampening riser 120, 122 may be coupled to any number of suspension lines 110, such as, for example, 1 to 16 suspension lines 110 per dampening riser 120, 122, or 8 to 16 suspension lines 110 per dampening riser 120, 122. In various embodiments, each of first and second dampening riser 120, 122 may couple to 8 suspension lines 110. Confluence 130 may comprise a stitching area that separates suspension lines 110 into first and second dampening risers 120, 122. For example, where the number of suspension lines 110 is 16, and the number of dampening risers 120, 122 is 2, stitching area 155 may separate suspension lines 110 into two sets of 8 suspension lines 110 with each of the 2 dampening risers 120, 122 coupled to an individual set of 8 suspension lines 110. At an inlet end 132 of confluence 130, suspension lines 110 may be gathered together. At an exit end 134, a first group of suspension lines 110 (e.g., suspension lines $110_1$-$110_8$) may be weaved or otherwise bound together to form first dampening riser 120, and a second group of suspension lines 110 (e.g., suspension lines $110_9$-$110_{16}$) may be weaved or otherwise bound together to form second dampening riser 122. Stated yet another way, suspension lines $110_1$-$110_8$ may be bound together and suspension lines $110_9$-$110_{16}$ may be bound together from second end 126 to exit end 134. In this regard, confluence 130 may comprise an area of suspension line assembly 104 wherein suspension lines 110 transition from the bound suspension lines of first and second dampening risers 120, 122 to discrete, independent suspension lines that are individually coupled about the circumference 103 of canopy 102. In various embodiments, dampening riser parachute 100 may comprise a greater number of suspension lines 110 as compared to the number of dampening risers 120, 122.

In various embodiments, suspension lines 110 terminate at exit end 134 of confluence 130. In this regard, first and second dampening riser 120, 122 may each be removably coupled to exit end 134 of confluence 130. In this regard, first and second dampening riser 120, 122 may be formed as separate members from suspension lines 110.

Upon deployment of dampening riser parachute 100, canopy 102 may deploy to increase drag, or otherwise decelerate, the object. Canopy 102 may comprise any suitable type of canopy and any suitable type of material, such as, for example, canvas, silk, nylon, aramid fiber (e.g., KEVLAR®), polyethylene terephthalate, and/or the like. In various embodiments, suspension lines 110 may be gathered together at confluence 130. In various embodiments, suspension lines 110 may be configured to connect canopy 102 to first and second dampening risers 120, 122. Suspension lines 110 connect canopy 102 to first and second dampening risers 120, 122 through confluence 130. First and second dampening risers 120, 122 may comprise a webbing material, such as, for example, nylon, aramid fiber (e.g., KEVLAR®), and/or the like.

Dampening riser parachute 100 may be configured to enable dampened deployment of first and second dampening risers 120, 122, wherein after deployment of first and second dampening risers 120, 122 to a first length L1, first and second dampening risers 120, 122 may release to a second, longer overall length L2. Multi-staged deployment of first and second dampening risers 120, 122 may allow dampening riser parachute 100 to have a first deployment stage comprising the first length (as shown FIG. 1A), and to have a second deployment stage comprising the second length (as shown in FIG. 1B).

First and second dampening risers 120, 122 may each comprise a first length L1 (also referred to herein as a primary length) and a second length L2 (also referred to herein as a secondary length). When dampening riser parachute 100 is deployed to the first length, as shown in FIG. 1A, first and second dampening risers 120, 122 may comprise first length L1 and may extend between attachment location 124 and exit end 134. When dampening riser parachute 100 is deployed to the second length, as shown in FIG. 1B, first and second dampening risers 120, 122 may comprise second length L2 and may extend between attachment location 124 and exit end 134. In various embodiments, the second length L2 may be at least ten percent greater than the first length L1. In various embodiments, the second length L2 may be at least fifteen percent greater than the first length L1. In various embodiments, the second length L2 may be at least twenty percent greater than the first length L1.

Figure 3A:
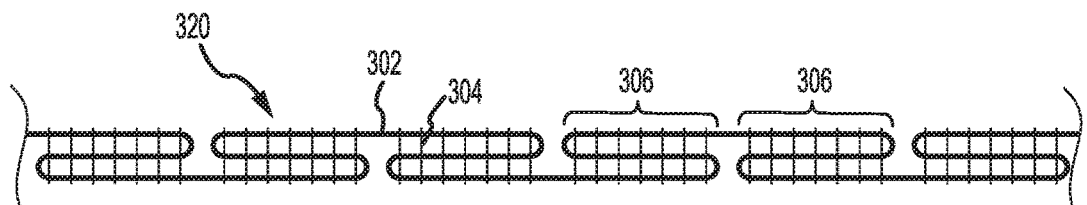
FIG. 3A illustrates a tear-attenuation dampening riser in a stowed position, in accordance with various embodiments.
Figure 3B:
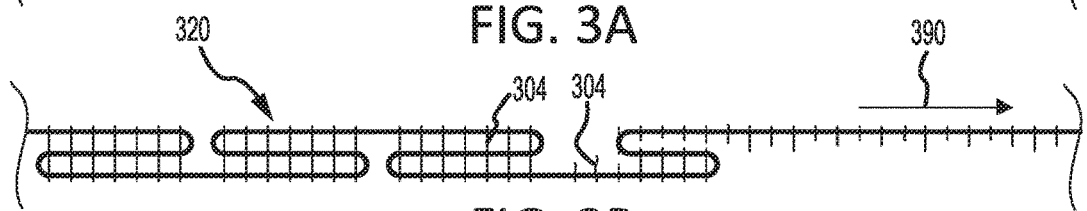
FIG. 3B illustrates the tear-attenuation dampening riser in a partially deployed position in response to a tensile force during deployment of a canopy, in accordance with various embodiments.

With reference to FIG. 3A and FIG. 3B, a dampening riser 320 is illustrated in a stowed position and a partially deployed position, respectively, in accordance with various embodiments. Dampening riser 320 may be similar to first dampening riser 120 and/or second dampening riser 122 of FIG. 1A and FIG. 1B. Dampening riser 320 may comprise a webbing 302 folded together in a folded position and stitched together via a thread 304. In various embodiments, webbing 302 is a braided material, for example, braided nylon, aramid fiber (e.g., KEVLAR®), and/or the like. In various embodiments, thread 304 is a natural fiber, such as cotton, wool, silk, and linen, among others. In various embodiments, thread 304 is a synthetic fiber, such as rayon, polyester, and nylon, among others. Webbing 302 may be folded over itself into a plurality of three-layer sections 306 that are sewn in place. With particular focus on FIG. 3B, in response to deployment of dampening riser parachute 100 (see FIG. 1A), a tensile force 390 may cause threads 304 to tear, thereby increasing an overall length of dampening riser 320 as the three-layer sections 306 are de-coupled due to the tearing of threads 304, allowing webbing 302 to unfold (e.g., to second length L2 of FIG. 1B). Although illustrated as comprising a plurality of three-layer sections 306, it is contemplated that other folding schemes may be used, such as folding webbing 302 into dual layer section, quad-layer sections, or any other number of layer sections. As the individual threads 304 tear, tensile force 390 may be dampened to decrease the peak magnitude of tensile force 390. In this regard, dampening riser 320 may be referred to herein as a tear-attenuating riser.

Figure 4A:
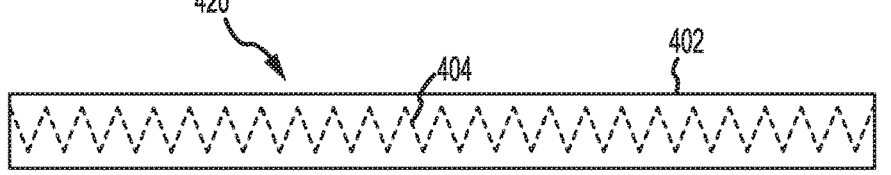
FIG. 4A illustrates a tear-attenuation dampening riser in a stowed position, in accordance with various embodiments.
Figure 4B:
FIG. 4B illustrates the tear-attenuation dampening riser in a deployed position in response to a tensile force during deployment of a canopy, in accordance with various embodiments.

With reference to FIG. 4A and FIG. 4B, a dampening riser 420 is illustrated in a stowed position and a deployed position, respectively, in accordance with various embodiments. Dampening riser 420 may be similar to first dampening riser 120 and/or second dampening riser 122 of FIG. 1A and FIG. 1B. Dampening riser 420 may comprise a webbing 402 sewn in a compressed position via a thread 404. In various embodiments, webbing 402 is a braided material, for example, braided nylon, aramid fiber (e.g., KEVLAR®), and/or the like. In various embodiments, thread 404 is a natural fiber, such as cotton, wool, silk, and linen, among others. In various embodiments, thread 404 is a synthetic fiber, such as rayon, polyester, and nylon, among others. Thread 404 may be sewn into webbing 420 in a zig-zag pattern. With particular focus on FIG. 3B, in response to deployment of dampening riser parachute 100 (see FIG. 1A), a tensile force 490 may cause webbing 403 to stretch, causing threads 404 to tear, thereby increasing an overall length of dampening riser 420 (e.g., to second length L2 of FIG. 1B). As the individual threads 404 tear, tensile force 490 may be dampened to decrease the peak magnitude of tensile force 490. In this regard, dampening riser 420 may be referred to herein as a tear-attenuating riser.

Figure 5A:
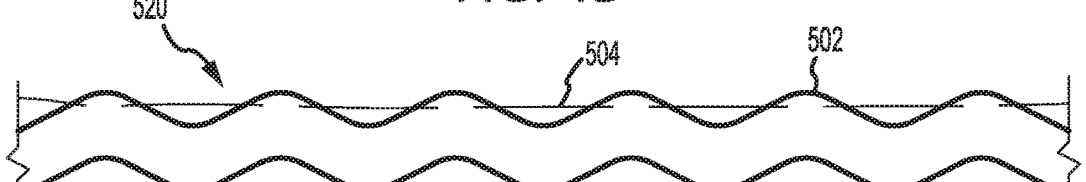
FIG. 5A illustrates a partially oriented yarn (POY) dampening riser in a stowed position, in accordance with various embodiments.
Figure 5B:
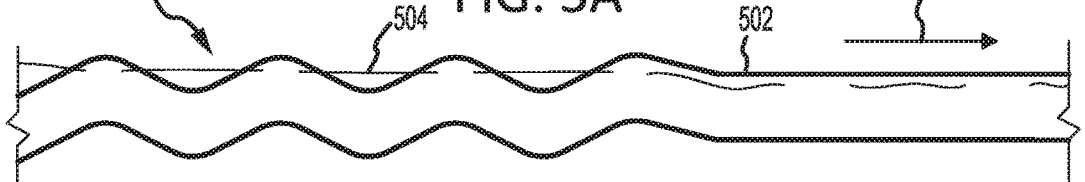
FIG. 5B illustrates the POY dampening riser in a partially deployed position in response to a tensile force during deployment of a canopy, in accordance with various embodiments.

With reference to FIG. 5A and FIG. 5B, a dampening riser 520 is illustrated in a stowed position and a partially deployed position, respectively, in accordance with various embodiments. Dampening riser 520 may be similar to first dampening riser 120 and/or second dampening riser 122 of FIG. 1A and FIG. 1B. Dampening riser 520 may comprise a webbing 502 held in a compressed position by a POY 504. In various embodiments, webbing 502 is a braided material, for example, braided nylon, aramid fiber (e.g., KEVLAR®), and/or the like. POY 504 may be sewn into webbing 520. POY 504 may extend along the length of webbing 520. In various embodiments, webbing 502 is a fully oriented yarn (FOY). Webbing 502 may be drawn over POY 504 in a compressed position such that webbing 502 is gathered together along the longitudinal direction, thereby decreasing the overall length of dampening riser 520. With particular focus on FIG. 5B, in response to deployment of dampening riser parachute 100 (see FIG. 1A), a tensile force 590 may be transmitted through POY 504 and webbing 502, thereby causing webbing 502 to elongate and POY 504 to plastically deform as POY 504 stretches under tensile loading. In various embodiments, POY 504 may plastically deform, thereby increasing in length and permitting webbing 502 to extend to a taut position, increasing an overall length of dampening riser 520 (e.g., to second length L2 of FIG. 1B). In various embodiments, POY 504 may tear, thereby permitting webbing 502 to extend to a taut position, increasing an overall length of dampening riser 520 (e.g., to second length L2 of FIG. 1B). As POY 504 plastically deforms or tears, tensile force 590 may be dampened to decrease the peak magnitude of tensile force 590.

Figure 6A:
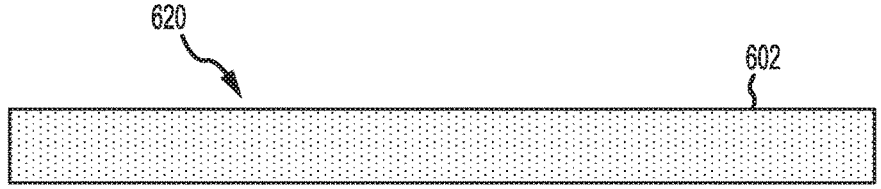
FIG. 6A illustrates a partially oriented yarn (POY) dampening riser in a stowed position, in accordance with various embodiments.
Figure 6B:
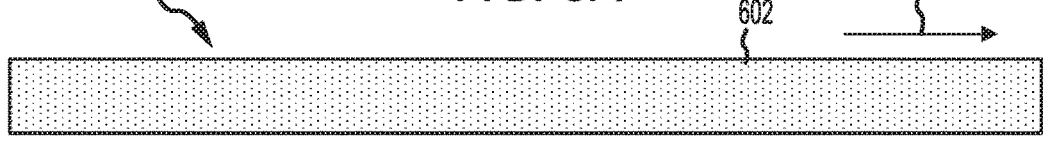
FIG. 6B illustrates the POY dampening riser in a partially deployed position in response to a tensile force during deployment of a canopy, in accordance with various embodiments.

With reference to FIG. 6A and FIG. 6B, a dampening riser 620 is illustrated in a stowed position and a deployed position, respectively, in accordance with various embodiments. Dampening riser 620 may be similar to first dampening riser 120 and/or second dampening riser 122 of FIG. 1A and FIG. 1B. Dampening riser 620 may comprise a braided POY webbing 602. With particular focus on FIG. 6B, in response to deployment of dampening riser parachute 100 (see FIG. 1A), a tensile force 690 may be transmitted through braided POY webbing 602, thereby causing braided POY webbing 602 to elongate as braided POY webbing 602 plastically deforms under tensile loading. In various embodiments, POY webbing 602 may plastically deform, thereby increasing in length and increasing an overall length of dampening riser 620 (e.g., to second length L2 of FIG. 1B). As POY webbing 602 plastically deforms or tears, tensile force 690 may be dampened to decrease the peak magnitude of tensile force 690.

Figure 7B:
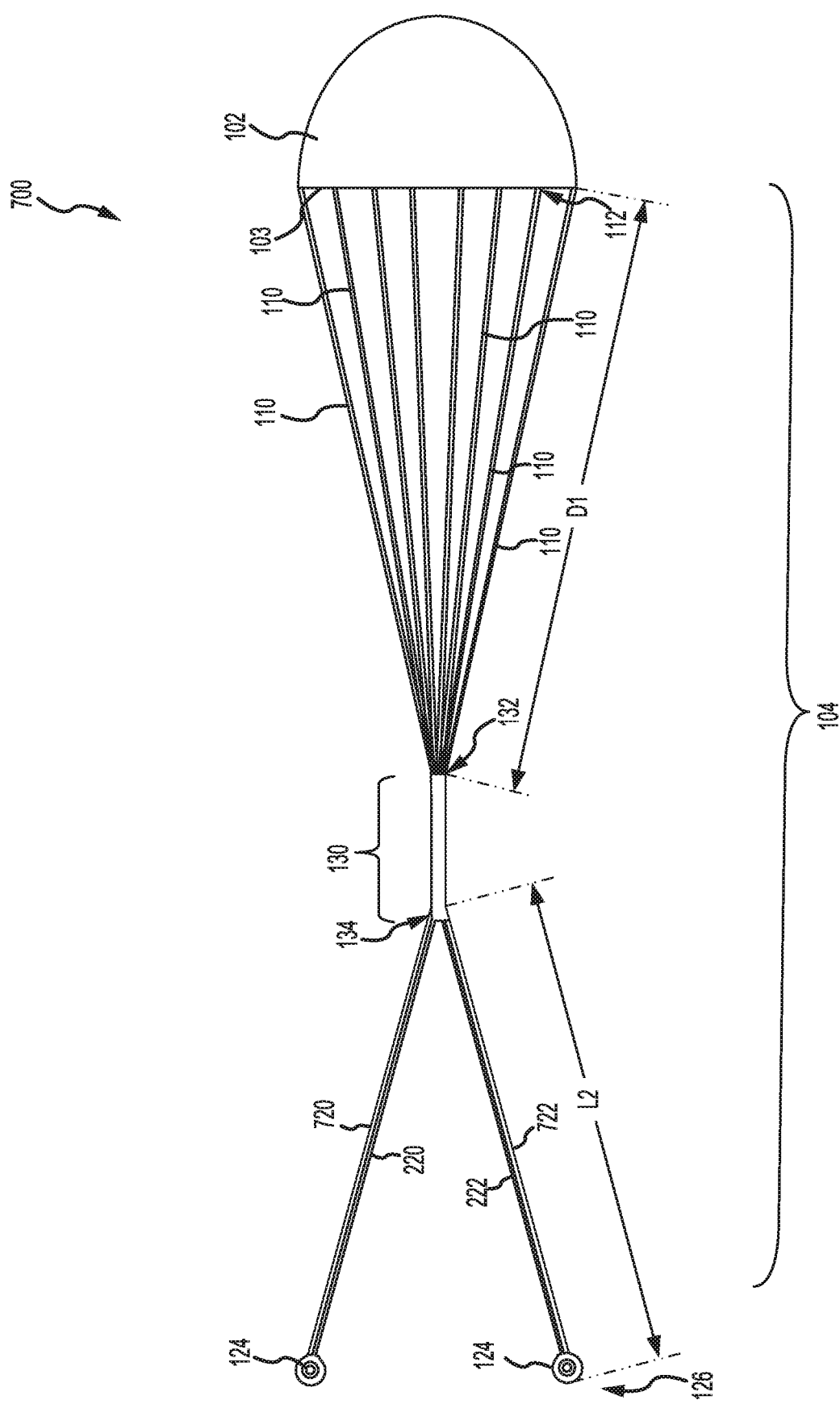
FIG. 7B illustrates a parachute having risers in stowed positions and each dampening riser comprising a second length, in accordance with various embodiments.

With respect to FIGS. 7A and 7B, elements with like element numbering, as depicted in FIGS. 1A and 1B, are intended to be the same and will not necessarily be repeated for the sake of clarity.

Having described various dampening risers, it is contemplated that a dampening riser alone, (e.g., dampening riser 320, dampening riser 420, dampening riser 520, or dampening riser 620) may be coupled between exit end 134 and attachment location 124. However, it is further contemplated that a dampening riser may be coupled in parallel with a riser formed from a group of suspension lines 110.

With reference to FIGS. 7A and 7B, a dampening riser parachute 700 is illustrated deployed to a first length (FIG. 7A) and to a second, longer length (FIG. 7B). In various embodiments, a first group of suspension lines 110 may be weaved or otherwise bound together to form first riser 220, and a second group of suspension lines 110 may be weaved or otherwise bound together to form second riser 222. A first dampening riser 720 may be coupled in parallel with first riser 220, and a second dampening riser 722 may be coupled in parallel with second riser 222. First and second dampening risers 720, 722 may be similar to dampening riser 320, dampening riser 420, dampening riser 520, and/or dampening riser 620 of FIGS. 3A, 4A, 5A, and 6A, respectively.

In various embodiments, first and second dampening risers 720, 722 may comprise a length L1 in a stowed position. First and second risers 220, 222 may comprise a greater length than length L1 of first and second dampening risers 720, 722. For example, in FIG. 7A, first and second risers 220, 222 are illustrated as being loosely coupled between exit end 134 and attachment locations 124, and first and second dampening risers 720, 722 are illustrated as being coupled taut between exit end 134 and attachment locations 124. In this regard, and with particular focus on FIG. 7B, in response to canopy 102 being deployed, first and second dampening risers 720, 722 may elongate (e.g., via tear-attenuation or via POY plastic deformation) and increase in length to length L2. First and second dampening risers 720, 722 may be equal in length to first and second risers 220, 222 at L2. In this regard, in response to first and second dampening risers 720, 722 elongating to length L2, tensile loads between confluence 130 and attachment locations 124 may be may be dampened and the dampened tensile loads may be transferred into first and second risers 220, 222.

Figure 8:
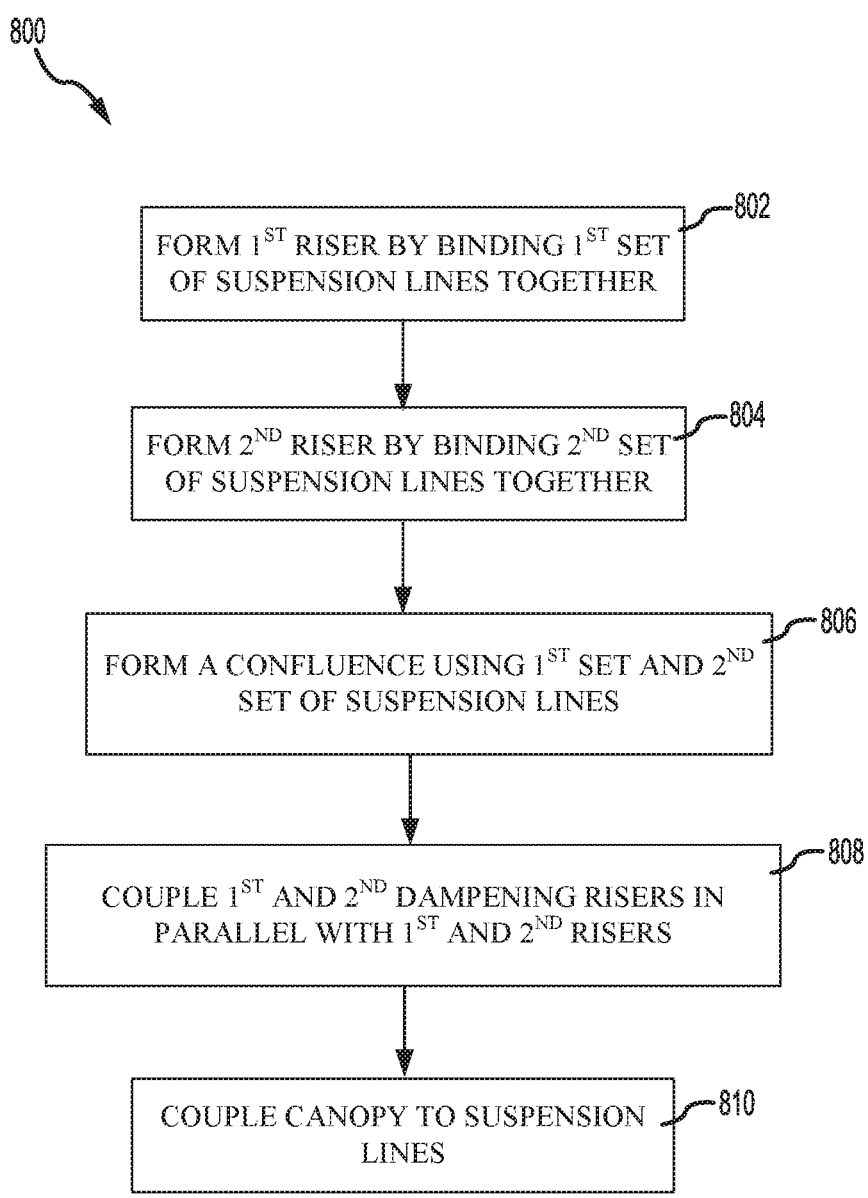
FIG. 8 illustrates a method, in accordance with various embodiments.

In accordance with various embodiments, and with reference to FIG. 8, a method 800 of making a parachute is disclosed. Method 800 includes forming a first riser by binding a first set of suspension lines together (step 802) and forming a second riser by binding a second set of suspension lines together (step 804). Method 800 further comprises forming a confluence using the first set of suspension lines and the second set of suspension lines (step 806). Method 300 includes coupling first and second dampening risers in parallel with the first and second risers (step 808). In various embodiments, method 800 may comprise coupling a canopy to the suspension lines of the confluence (step 810).

With combined reference to FIG. 8 and FIGS. 7A and 7B, in accordance with various embodiments, step 802 may comprising forming a first riser (e.g., riser 220) by binding the a first set of suspension lines 110 together. Step 804 may comprise forming a second riser (e.g., riser 222) by binding a second set of suspension lines 110 together. Step 806 may include forming confluence 130. Confluence 130 may comprise the first and second sets of suspension lines 110.

In various embodiments, step 808 may include coupling first dampening riser 720 in parallel with first riser 220. Step 808 may include coupling second dampening riser 722 in parallel with second riser 222. First and second dampening risers 720, 722 may be coupled in parallel with first and second risers 220, 222 by weaving, stitching, adhering, braiding, and/or or coupling (e.g., via a shackle) first and second dampening risers 720, 722 to first and second risers 220, 222, respectively.

In various embodiments, step 810 may include coupling canopy 202 to suspension lines 110.

Figure 9:
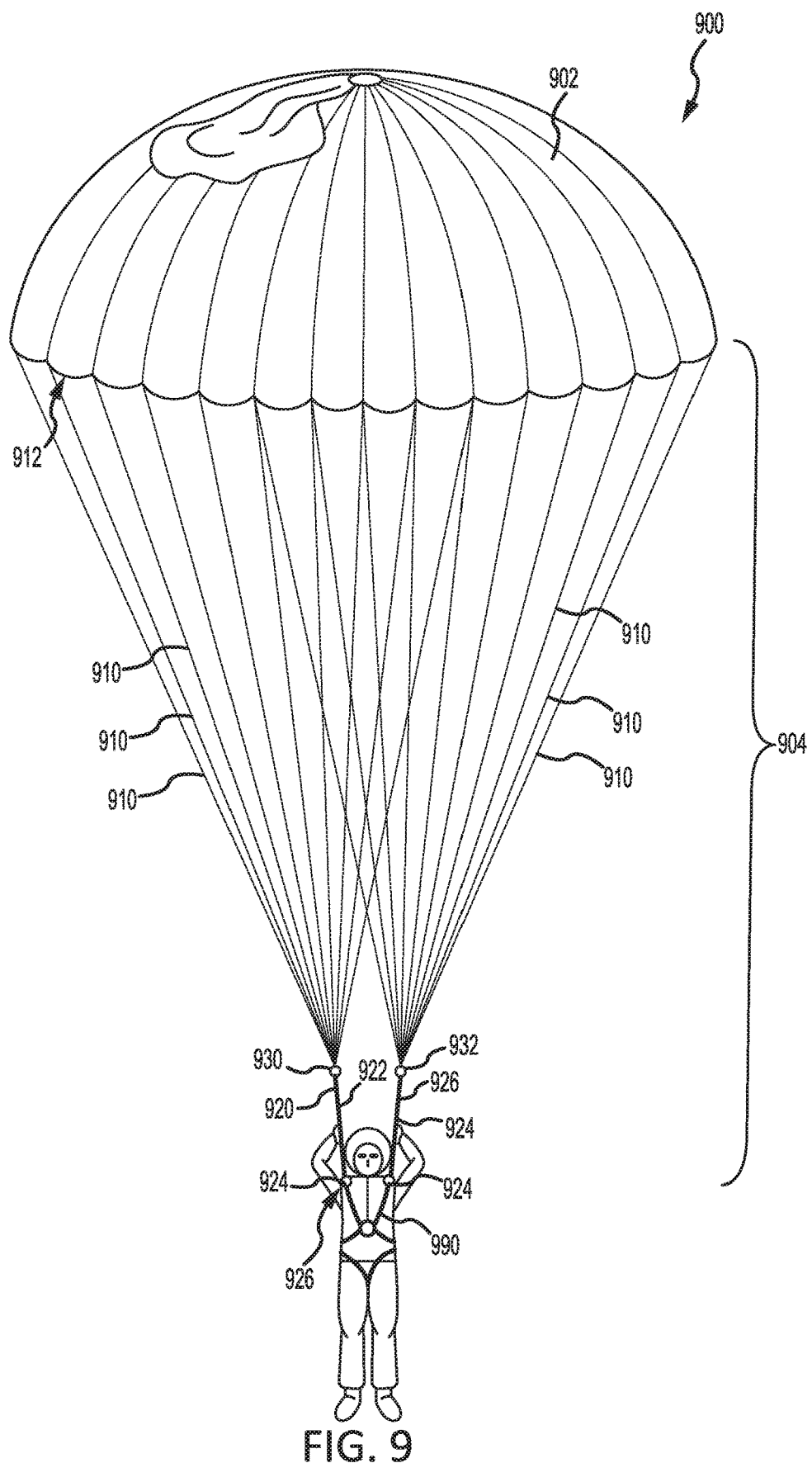
FIG. 9 illustrates a parachute having dampening risers, in accordance with various embodiments.

With reference to FIG. 9, a dampening riser parachute 900 is illustrated, in accordance with various embodiments. Dampening riser parachute 900 may comprise a canopy 902 and a suspension line assembly 904. Suspension line assembly 904 may comprise suspension lines 910, a first confluence 930 which splits into a first dampening riser 920 and a second dampening riser 922, and a second confluence 932 which splits into a third dampening riser 924 and a fourth dampening riser 926. In various embodiments, suspension lines 910 may be attached to canopy 902 at a first end 912 of suspension line assembly 904.

Dampening risers 920, 922, 924, 926 may be configured to attach an object, such as an occupant harness 990, to parachute 900. In various embodiments, dampening risers 920, 922, 924, 926 may each comprise an attachment location 924. Attachment locations 924 may be proximate a second end 926 of suspension line assembly 904. Attachment location 924 may comprise any suitable attachment mechanism for securing an object to parachute 900. In various embodiments, attachment location 924 may comprise a loop created by each dampening riser being bound to itself. In various embodiments, attachment location 924 may comprise a shackle. Dampening risers 920, 924 may be configured to attach to a front portion of occupant harness 990. Dampening risers 922, 926 may be configured to attach to a rear portion of occupant harness 990.

In various embodiments, dampening riser parachute 900 may be similar to dampening riser parachute 100 of FIG. 1A and FIG. 1B. In various embodiments, dampening riser parachute 900 may be similar to dampening riser parachute 700 of FIG. 7A and FIG. 7B. In various embodiments, dampening risers 920, 922, 924, 926 may each be similar to dampening riser 320 of FIG. 3A and FIG. 3B. In various embodiments, dampening risers 920, 922, 924, 926 may each be similar to dampening riser 420 of FIG. 4A and FIG. 4B. In various embodiments, dampening risers 920, 922, 924, 926 may each be similar to dampening riser 520 of FIG. 5A and FIG. 5B. In various embodiments, dampening risers 920, 922, 924, 926 may each be similar to dampening riser 620 of FIG. 6A and FIG. 6B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A suspension line assembly for a parachute, comprising:
   a plurality of suspension lines bound together at a confluence;
   a dampening riser extending between the confluence and an attachment location, the dampening riser at least partially formed from a set of suspension lines in the plurality of suspension lines;
   wherein the dampening riser comprises a first length in a stowed position and the dampening riser is configured to extend to a second length in a deployed position in response to a tensile force applied to the dampening riser so as to dampen the tensile force.

2. The suspension line assembly of claim 1, wherein the first length is less than the second length.

3. The suspension line assembly of claim 2, wherein the first length is at least ten percent less than the second length.

4. The suspension line assembly of claim 1, wherein the dampening riser comprises a webbing and a thread holding the webbing in a folded position, wherein the thread is configured to tear in response to the dampening riser moving to the deployed position.

5. The suspension line assembly of claim 1, wherein the dampening riser comprises a webbing and a thread holding the webbing in a compressed position, wherein the thread is configured to tear in response to the dampening riser moving to the deployed position.

6. The suspension line assembly of claim 1, wherein the dampening riser comprises a fully oriented yarn (FOY) webbing and a partially oriented yarn (POY), wherein the FOY webbing is held in a compressed position by the POY when the dampening riser is in the stowed position, wherein the POY is configured to plastically deform in response to the dampening riser moving to the deployed position.

7. The suspension line assembly of claim 1, wherein the dampening riser comprises a partially oriented yarn (POY) webbing, wherein the POY webbing is configured to plastically deform in response to the dampening riser moving to the deployed position.

8. The suspension line assembly of claim 1, further comprising a second riser and a second dampening riser, the second riser extending between the confluence and a second attachment location, wherein the second dampening riser comprises the first length in the stowed position and the second dampening riser is configured to extend to the second length in the deployed position in response to a second tensile force applied to the second dampening riser so as to dampen the second tensile force.

9. A parachute, comprising:
   a canopy; and
   a suspension line assembly coupled to the canopy, the suspension line assembly comprising:
   a plurality of suspension lines bound together at a confluence via one of weaving or stitching;
   a first dampening riser coupled to the confluence;
   a second dampening riser coupled to the confluence;
   a first riser formed from a first set of the plurality of suspension lines;
   a second riser formed from a second set of the plurality of suspension lines, wherein:
      the first dampening riser is coupled in parallel with the first riser, and the second dampening riser is coupled in parallel with the second riser,
      the first dampening riser comprises a first length in a stowed position and the first dampening riser is configured to extend to a second length in response to the canopy being deployed,
      the first dampening riser comprises a fully oriented yarn (FOY) webbing and a partially oriented yarn (POY), wherein the FOY webbing is held in a compressed position by the POY when the first dampening riser is in the stowed position, wherein the POY is configured to plastically deform in response to the first dampening riser moving to a deployed position.

10. The parachute of claim 9, wherein the first dampening riser extends to the second length in response to a tensile force applied to the dampening riser.

11. The parachute of claim 10, wherein the first length is less than the second length.

12. The parachute of claim 11, wherein the first length is at least ten percent less than the second length.

13. The parachute of claim 9, wherein the first dampening riser comprises a webbing and a thread holding the webbing in a folded position, wherein the thread is configured to tear in response to the first dampening riser moving to the deployed position.

14. The parachute of claim 9, wherein the first dampening riser comprises a webbing and a thread holding the webbing in the compressed position, wherein the thread is configured to tear in response to the first dampening riser moving to the deployed position.

15. A method of making a parachute, comprising:
   forming a first riser by binding a first set of suspension lines together;
   forming a second riser by binding a second set of suspension lines together;
   forming a confluence using the first set of suspension lines and the second set of suspension lines;
   coupling a first dampening riser in parallel with the first riser between the confluence and a first attachment location of the first riser; and
   coupling a second dampening riser in parallel with the second riser between the confluence and a second attachment location of the second riser,
   wherein the first dampening riser and the second dampening riser each comprise a fully oriented yarn (FOY) webbing and a partially oriented yarn (POY), wherein the FOY webbing of the first dampening riser is held in a compressed position by the POY when the first dampening riser is in a stowed position, wherein the POY is configured to plastically deform in response to the first dampening riser moving to a deployed position.

16. The method of claim 15, further comprising coupling a canopy to the first set of suspension lines and the second set of suspension lines.

17. The method of claim 15, further comprising forming the first dampening riser and the second dampening riser, wherein a length of the first dampening riser is less than that of the first riser.

18. The parachute of claim 9, wherein the first riser comprises a third length that is greater than the first length of the first dampening riser in the stowed position.

* * * * *